US010936641B2

(12) United States Patent
Romano et al.

(10) Patent No.: US 10,936,641 B2
(45) Date of Patent: *Mar. 2, 2021

(54) CALL SUMMARY

(71) Applicant: Verint Systems Ltd., Herzliya Pituach (IL)

(72) Inventors: Roni Romano, Even Yehuda (IL); Galia Zacay, ganei-Tikva (IL); Rahm Fehr, Tel Aviv (IL)

(73) Assignee: VERINT SYSTEMS LTD., Pituach (IL)

( * ) Notice: Subject to any disclaimer, the term of this patent is extended or adjusted under 35 U.S.C. 154(b) by 166 days.

This patent is subject to a terminal disclaimer.

(21) Appl. No.: 15/985,157

(22) Filed: May 21, 2018

(65) Prior Publication Data

US 2019/0018894 A1 Jan. 17, 2019

Related U.S. Application Data

(63) Continuation of application No. 14/610,249, filed on Jan. 30, 2015, now Pat. No. 9,977,830.

(60) Provisional application No. 61/934,385, filed on Jan. 31, 2014.

(51) Int. Cl.
*G06F 16/34* (2019.01)
*G06Q 10/10* (2012.01)
*G06Q 30/00* (2012.01)
*G06N 5/02* (2006.01)

(52) U.S. Cl.
CPC ........... *G06F 16/345* (2019.01); *G06Q 10/10* (2013.01); *G06Q 30/016* (2013.01); *G06N 5/022* (2013.01)

(58) Field of Classification Search
CPC .... G06F 16/345; G06Q 30/016; G06Q 10/10; G06N 5/022
USPC ........................................................ 707/755
See application file for complete search history.

(56) References Cited

U.S. PATENT DOCUMENTS

| | | | | |
|---|---|---|---|---|
| 5,774,845 A | * | 6/1998 | Ando | G06F 40/268 704/231 |
| 6,640,231 B1 | * | 10/2003 | Andersen | G06F 16/30 707/999.104 |
| 8,452,791 B2 | * | 5/2013 | Fortuna | G06F 16/93 707/765 |
| 8,725,754 B2 | * | 5/2014 | Gopalakrishnan | G06F 16/288 707/764 |
| 8,751,486 B1 | * | 6/2014 | Neeman | G06F 16/3331 707/722 |
| 8,868,562 B2 | * | 10/2014 | Crouch | G06F 16/316 707/739 |
| 8,983,994 B2 | * | 3/2015 | Neels | G06F 40/186 707/765 |

(Continued)

*Primary Examiner* — Phong H Nguyen
(74) *Attorney, Agent, or Firm* — Meunier Carlin & Curfman LLC

(57) ABSTRACT

A faster and more streamlined system for providing summary and analysis of large amounts of communication data is described. System and methods are disclosed that employ an ontology to automatically summarize communication data and present the summary to the user in a form that does not require the user to listen to the communication data. In one embodiment, the summary is presented as written snippets, or short fragments, of relevant communication data that capture the meaning of the data relating to a search performed by the user. Such snippets may be based on theme and meaning unit identification.

19 Claims, 4 Drawing Sheets

(56) References Cited

U.S. PATENT DOCUMENTS

| | | | |
|---|---|---|---|
| 9,116,984 B2* | 8/2015 | Caldwell | G06F 16/345 |
| 2007/0219776 A1* | 9/2007 | Gamon | G06F 40/20 |
| | | | 704/9 |
| 2009/0063426 A1* | 3/2009 | Crouch | G06F 16/316 |
| | | | 707/999.003 |
| 2009/0083261 A1* | 3/2009 | Nagano | G06F 16/951 |
| | | | 707/999.005 |
| 2010/0088130 A1* | 4/2010 | Bonchi | G06Q 50/01 |
| | | | 705/7.41 |
| 2013/0006973 A1* | 1/2013 | Caldwell | G06F 16/345 |
| | | | 707/723 |
| 2013/0117316 A1* | 5/2013 | Gopalakrishnan | G06F 16/288 |
| | | | 707/790 |
| 2013/0318236 A1* | 11/2013 | Coates | H04L 41/22 |
| | | | 709/224 |
| 2014/0074889 A1* | 3/2014 | Neels | G06F 16/248 |
| | | | 707/779 |
| 2014/0207734 A1* | 7/2014 | Lin | H04L 67/22 |
| | | | 707/610 |
| 2015/0039651 A1* | 2/2015 | Kinsely | G06F 16/254 |
| | | | 707/779 |
| 2019/0179861 A1* | 6/2019 | Goldenstein | G06F 16/9535 |

* cited by examiner

CALL SUMMARY

CROSS REFERENCE TO RELATED APPLICATIONS

This application is a continuation of and incorporates entirely by reference U.S. patent application Ser. No. 14/610,249, now U.S. Pat. No. 9,977,830, issued on May 22, 2018 and filed on Jan. 30, 2015, claiming priority to U.S. Provisional Patent Application Ser. No. 61/934,385 filed on Jan. 31, 2014, the contents of which are also incorporated entirely by reference herein.

BACKGROUND

The present disclosure relates to the field of automated data processing, and more specifically to the application of ontology programming to process and summarize communication data.

Prior art systems and methods for understanding content of communication data, such as customer service calls, require a user to personally review the individual data elements. For example, prior art systems for processing and understanding call center data require a user to listen to customer service call recordings in order to understand the content of the call data. Though some systems are capable of directing a user to the point where certain content may occur in the call, the user still must play and listen to at least an identified section of data to determine its contents and relevance. Prior art systems do not offer a good way to understand what is happening in large amounts of auditory data, such as call center data, without listening to it. Thus, reviewing communication data using prior art systems takes a lot of time and is cumbersome.

SUMMARY

The present inventors recognize that a faster and more streamlined system is needed for providing summary and analysis of large amounts of communication data. Accordingly, the inventors developed the present system and method that employs an ontology to automatically summarize communication data and present the summary to the user in a form that does not require the user to listen to the communication data. In one embodiment, the summary is presented as written snippets, or short fragments, of relevant communication data that capture the meaning of the data relating to a search performed by the user. Such snippets may be based on theme and meaning unit identification.

In one aspect of the disclosure a method of summarizing communication data is described. The method comprises receiving communication data; identifying one or more relevant themes in the communication data; locating the relevant themes in the communication data; creating snippets of the communication data to include the located relevant themes; and displaying the snippets.

An initial step can consist of receiving one or more terms from a user. The step of identifying one or more relevant themes can include identifying one or more themes that relate to the one or more terms received from the user. Identifying one or more relevant themes can include presenting a list of themes to a user and receiving a selection from the user of one or more of the themes presented in the list. The list of themes can include all of the themes present in a dataset. The list of themes can include a predefined number of themes that appear most commonly in a dataset. The list of themes can include themes that appear in a dataset at least a predefined number of times. The communication data can be a transcript of an interpersonal interaction. Furthermore, the communication data can be divided into a plurality of meaning units; and one or more meaning units can be selected that include the located relevant themes to create the snippets. Finally, the snippets can be arranged temporally to provide a summary of the communication data.

In another aspect of the disclosure, a communication system for summarizing communication data is described, the system comprising a processing system comprising computer-executable instructions stored on memory that can be executed by a processor in order to: receive communication data; identify one or more relevant themes in the communication data; locate the relevant themes in the communication data; create snippets of the communication data to include the located relevant themes; and display the snippets. The system of claim 10 further comprising an initial step of receiving one or more terms from a user, and wherein the step of identifying one or more relevant themes includes identifying one or more themes that relate to the one or more terms received from the user. The step of identifying one or more relevant themes includes presenting a list of themes to a user and receiving a selection from the user of one or more of the themes presented in the list. The list of themes includes all of the themes present in a dataset. The list of themes includes a predefined number of themes that appear most commonly in a dataset. The list of themes can include themes that appear in a dataset at least a predefined number of times. The communication data can be a transcript of an interpersonal interaction. The communication data can be divided into a plurality of meaning units; and one or more meaning units can be selected that include the located relevant themes to create the snippets. The snippets can be arranged temporally to provide a summary of the communication data.

In another aspect of the disclosure, a computer readable non-transitory storage medium comprising computer-executable instructions is disclosed, that when executed by a processor of a computing device performs a method, comprising: receiving communication data; identifying one or more relevant themes in the communication data; locating the relevant themes in the communication data; creating snippets of the communication data to include the located relevant themes; and displaying the snippets.

BRIEF DESCRIPTION

DETAILED DESCRIPTION

Figure 1:
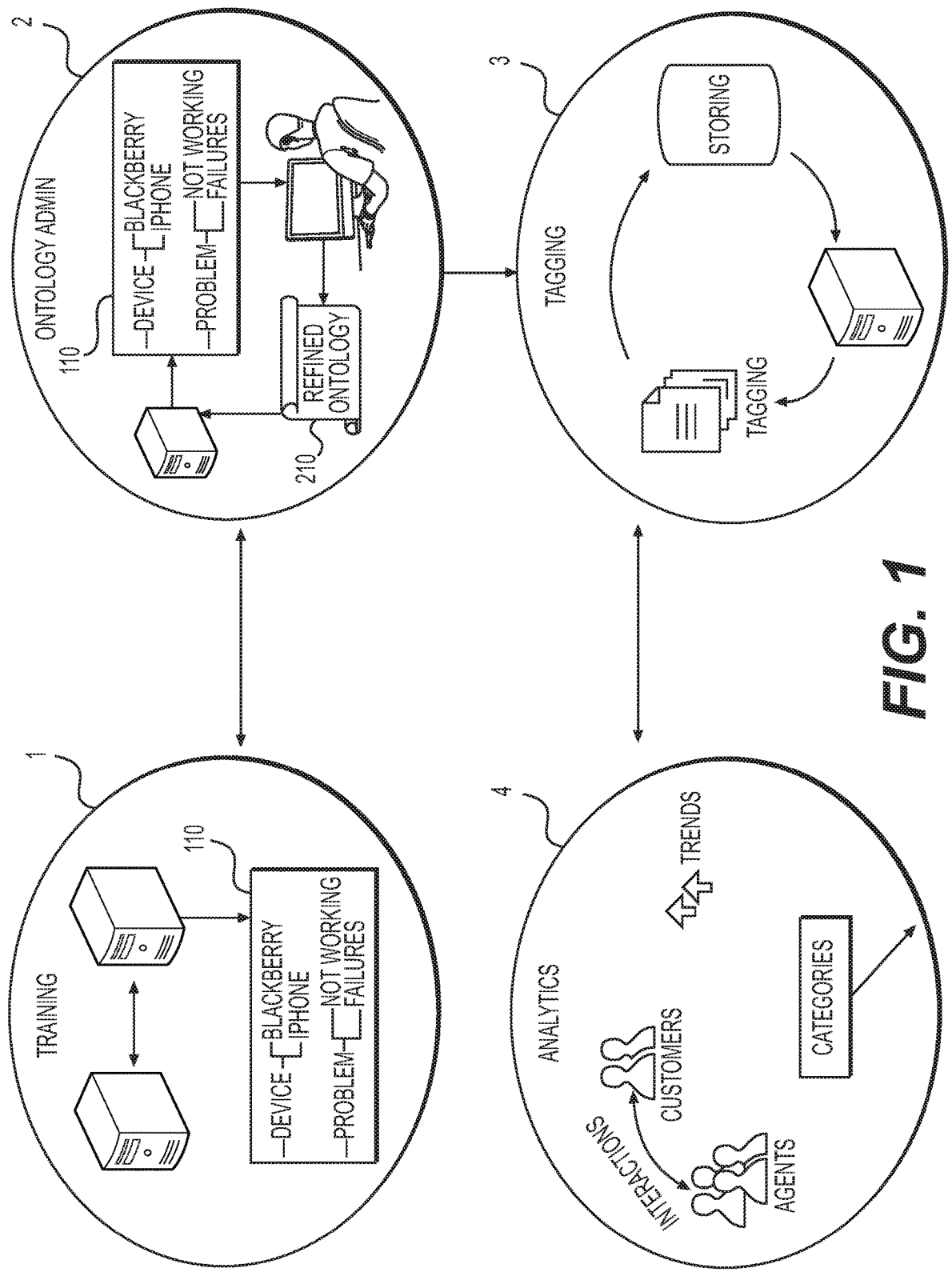
FIG. 1 depicts an exemplary embodiment of the ontology process and programming disclosed herein.

An ontology is a formal representation of a set of concepts, and the relationships between those concepts in a defined domain. The ontology models the specific meanings of terms as they apply to that domain, and may be devised to incorporate one or several different spoken and/or written languages. As a non-limiting example, the ontologies described herein are with respect to customer service interactions. A particular ontology may be defined for a specific domain, such as financial services, consumer products, subscription services, or some other service interactions.

Communication data may exist in the form of an audio recording, streaming audio, a transcription of spoken content, or any written correspondence or communication. In the context of customer service interactions, for example, communication content may exist as various forms of data, including but not limited to audio recording, streaming audio, transcribed textual transcript, or documents containing written communications, such as email, physical mail, internet chat, text messages, etc. In one embodiment, the communication data may be a transcript between a customer service agent or interactive voice response (IVR) recording with a customer/caller. While the present disclosure is exemplified herein by describing an embodiment involving the analysis of audio data, such as recorded audio transcripts, it is to be understood that in alternative embodiments, oral or written communications may be used or analyzed. An ontology can be developed and applied across all types of communication data, for example, all types of customer interactions (which may include interactions in multiple languages), to develop a holistic tool for processing and interpreting such data.

The disclosed solution uses machine learning-based methods to improve the knowledge extraction process in a specific domain or business environment. By formulating a specific company's internal knowledge and terminology, the ontology programming accounts for linguistic meaning to surface relevant and important content for analysis. For example, the disclosed ontology programming adapts to the language used in a specific domain, including linguistic patterns and properties, such as word order, relationships between terms, and syntactical variations. Based on the self-training mechanism developed by the inventors, the ontology programming automatically trains itself to understand the business environment by processing and analyzing a defined corpus of communication data.

The premise on which the ontology is built is that meaningful terms are detected in the corpus and then classified according to specific semantic concepts, or entities. First, the corpus, or dataset, is segmented into meaning units. Meaning units are sequences of words that express an idea, such as may be the equivalent of sentences. An example of a meaning unit in a customer service context would be the customer statement "I would like to buy a phone."

Within the meaning units, terms are identified and extracted. Term extraction is a process that reviews all meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Terms are tagged in a non-overlapping way, with longer terms being generally preferred over shorter ones. For example, the term "my phone number" is counted as one term, rather than two—i.e. "my phone" and "my phone number."

Once the main terms are defined, direct relations or linkages can be formed between these terms and their associated entities. Then, the relations are grouped into themes, which are groups or abstracts that contain synonymous relations. Relations are detected in interactions and surfaced during the system's self-training process. A theme is essentially a single concept defined by its associated relations, which represent that same concept among multiple interactions in the corpus. Themes provide users with a compressed view of the characteristics of interactions throughout the corpus. Themes may be identified according to the exemplary methods described herein. Themes provide a basis for analytic functions of the ontological software, such as the communication data summary module described herein.

The presently disclosed ontology solution incorporates four main stages. As seen in FIG. 1, the four main stages include training 1, ontology administration 2, ontology tagging 3, and ontology analytics 4. The training step 1 involves internal machine learning in which the system learns the customer's specific domain and formulates an initial ontology 110. The initial ontology 110 is then passed to the ontology administration step 2 wherein the user reviews the initial ontology 110 and refines it to create a refined ontology 210. The refined ontology 210 is then stored and passed to the tagging module 3. Tagging is a continuous online process that uses the ontology to tag tracked items in incoming interactions, and stores the tagged interactions in a persistent repository. Finally, the tagged interactions are then used by the analytics module 4 to analyze and extract business data based on an enhanced formulization of a company's internal knowledge and terminology.

An ontology, which generally refers to a collection of entities and their relations, is one way in which an automated interpretation of a customer service interaction can be developed, organized, and presented as disclosed herein. Generally, an ontology as disclosed herein includes terms which are individual words or short phrases that represent the basic units or concepts that might come up in the customer service interaction. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction. All words in the corpus can only be associated with one term, and each term can only be counted once.

Classes are broader concepts that encapsulate or classify a set of terms. Classes describe semantic concepts to which classified terms are related. It is also to be understood that classes may also classify or encapsulate a set of subclasses in which the terms are classified. Non-limiting examples of classes, may be include "objects", "actions", "modifiers", "documents", "service", "customers", or "locations". However, these are not intended to be limiting on the types of classes, particularly the types of classes that may appear in an ontology directed to a specific or specialized domain.

The classes, subclasses, and terms are connected by a plurality of relations which are defined binary directed relationships between terms and classes/subclasses or subclasses to classes. In a non-limiting example, the term "pay" is defined under the class "action" and the term "bill" is defined in the class "documents". Still further binary directed relationships can be defined between these class/term pairs. The action/pay pair is related to the document/bill pair in that the payment action requires an underlying document, which may be a bill. In another non-limiting example, the term "broken" is defined in the class "problems" and the term "iPhone" is defined in the class "device". The problem/broken pair can also have a directed relationship to the "devices" class in which the "iPhone" term is a specific example as represented by the devices/iPhone pair.

In general, developing an ontology includes defining relations within a dataset. Relations are linkages or relationships between the defined terms in the corpus. For example, "cancel>account," "speak with>supervisor," and "buy>new iPhone" are exemplary relations. The system defines a concise number of strong, meaningful relations according to certain predefined policies or rules. Those strong relations are given a higher score, and thus are given preference over other, lower-scoring relations.

Then, based upon the established relations, the system identifies, or surfaces, themes appearing within the dataset. Themes are groups or categories of relations that are similar in meaning. A theme represents a concept and is defined by its associated relations. A theme encapsulates the same concept among several interactions. Themes allow users to easily and efficiently understand the characteristics of interactions throughout the corpus. For example, the theme "got an email" might correspond to several relations, including "got the email," "got confirmation," "received an email," "received an email confirmation," etc. Preferably, the themes are expanded to incorporate as many of the identified terms and relations as possible. Since data sets may commonly be derived from speech-to-text translation algorithms, and because those algorithms are imperfect and often make slight mistranscriptions, it is desirable to use algorithms that can associate textually similar terms together—e.g., manager and managers, Sunday and Monday.

In a call center data set, for example, one theme may represent a concept expressed in several different calls. In that way, a theme can provide a summary, or a compressed view, of the characteristics of the interactions in a communications data set. Preferably, a relation is assigned to only a single theme. Additionally, preferably only relations are tagged in the tagging phase 3 of a corpus. Themes are used in the analytics phase 4, and act as building blocks employed by analytics applications or modules, such as the summary module 1300 described herein.

Themes can be displayed by displaying all of the relations comprising that theme and providing statistics about the appearance of such relations and/or the terms therein. In order to display a theme, or to create useful user interfaces displaying and conveying information about themes and about a group of themes in a dataset, each theme should be given a unique identifier, or theme name. For example, information about themes and relations in a communication data set can be displayed by displaying the terms therein and connecting them with lines.

The theme name is an identifier for the theme that may be used, for example, in user interfaces as a shortcut for conveying information about the theme using only a short string of words and/or characters. The theme name can be established by any number of methods. For example, the theme name can be created based on the top relation or relations in the dataset, or a particular subset of the dataset being analyzed. Determination of the top relations may be based on any number of factors, or a combination thereof. For example, the theme name may be devised by concatenating the terms of the first relation—"speak" and "manager". In another embodiment, the name may be longer and may include, for example, the top three relations, such as "speak, talk, find→manager, supervisor, superior."

Figure 2:
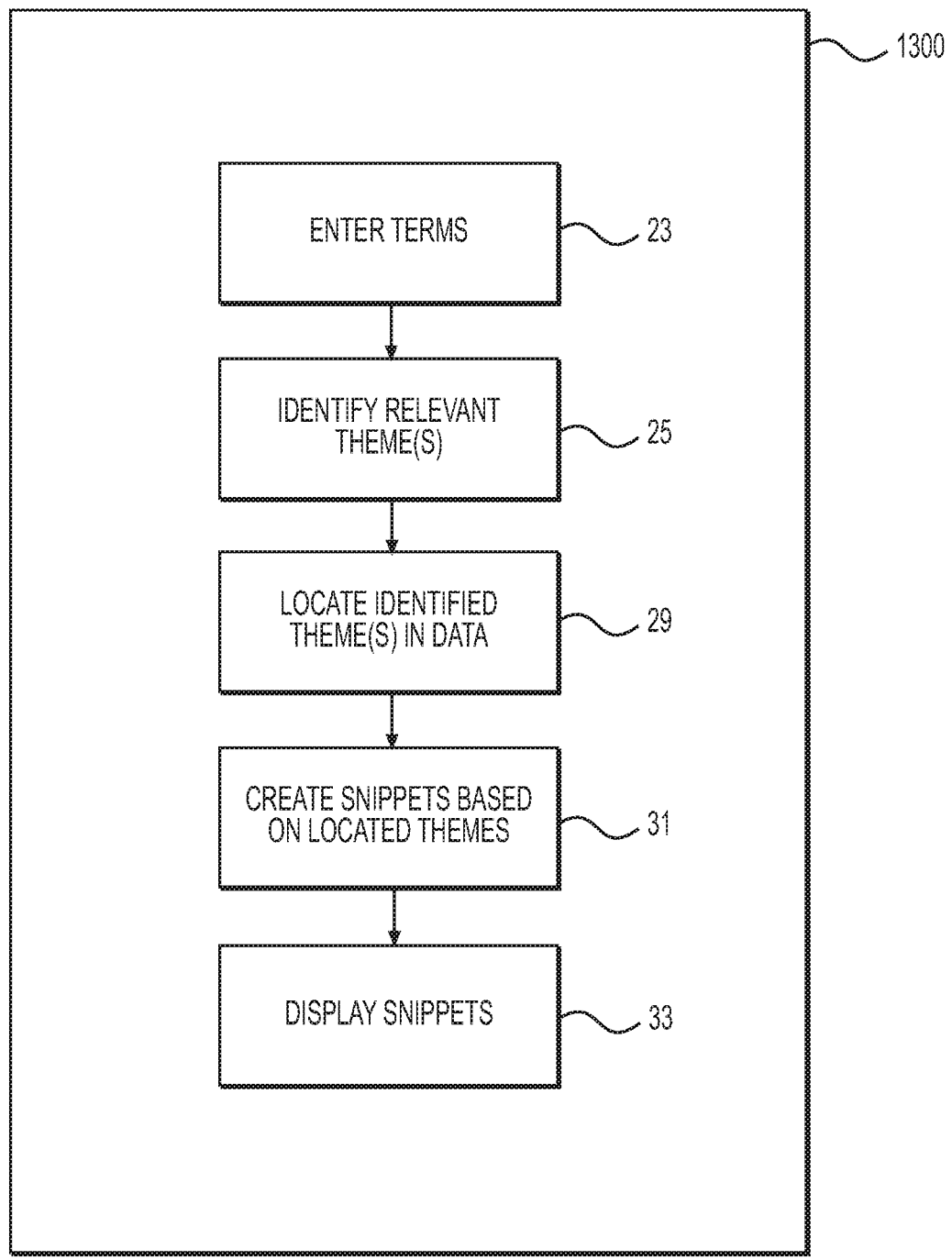
FIG. 2 is a flow chart depicting one embodiment of a method of summarizing communication data.

Based on the themes, analytics modules 4 can create summaries of communication data. FIG. 2 provides an overview of an exemplary summary method and module 1300 for processing communication data to develop relevant summaries thereof. Such summaries may be summaries of data relevant to a particular term or set of terms, such as term(s) entered by a user. In the exemplary embodiment of the method depicted in FIG. 2, a user enters one or more terms at step 23 regarding which the user wants to assess the relevant communication data. In one embodiment, the user may enter a term or terms into a dialog box or field. Alternatively, the user may be presented with a list of themes present in a particular identified dataset, and the user could select one or more of the listed themes. The listed themes may include all of the themes present in a dataset, or they may include the themes most commonly appearing in the dataset. For example, the list may include only those themes that appear in a communication dataset at least a predefined number of times. In another embodiment, the list may include a predefined number of themes that appear most commonly in a dataset. In still other embodiments, the list of themes may be created based on other methods.

Next, at step 25 the summary module 1300 identifies one or more themes related to the term(s). In an exemplary embodiment, the user enters the term "supervisor." From this entered term, the module may identify the theme "speak supervisor." The "speak supervisor" then may exemplarily include a set of relations such as "talk→supervisor," "get-→manager," "contact→supervisor", etc. Then at step 29, the module 1300 locates those identified themes in the communication data. From there, the module 1300 creates snippets 50 at step 31 based on the located themes, wherein snippets include the relevant communication data surrounding the located themes. For example, the snippets 50 may be created to include a certain number of characters, words, lines, and/or sentences in the communication data before and after each located theme. In an alternative embodiment, the snippets may be created based on the meaning unit or units surrounding the located theme. Thus, the snippet may be the meaning unit that includes the located theme. In some embodiments, the snippet may further include one or more meaning units before and/or after the meaning unit that includes the theme. In still other embodiments, the snippets may be comprised of only the theme name(s), which may include one or more relations encompassed in the theme, and/or present in the relevant portion of the communication data. Finally, at step 33 the module 1300 displays the snippets 50 to the user, such as in the form of the user display depicted in FIG. 3.

In still other embodiments, the module may provide snippets 50 related to the most important or common theme or themes appearing in a particular dataset, such as a particular call or set of calls. In such an embodiment the module 1300 may determine which themes represent the main purpose, or most significant aspect, of the communication data set or subset. In a customer service call center environment, for example, the most important theme or themes in a call recording would represent the main purpose or reason for the call. The snippets would then be created to include such important themes, and would thereby summarize the reason or purpose of the call.

As described herein, the snippets 50 produced by the summary module provide the user with an easy and accessible summary of the relevant portions of a communication dataset. Thereby, the user can understand the relevant aspects of the communication dataset without having to spend significant time reviewing portions of the data. In the customer service call center context, this means that the user can understand the content of relevant customer service call interactions without having to listen to the actual recorded calls. The snippets 50 may be arranged temporally so as to provide a sequential summary of important features of a dataset, such as a customer service interaction or a series of customer service interactions.

Figure 3:
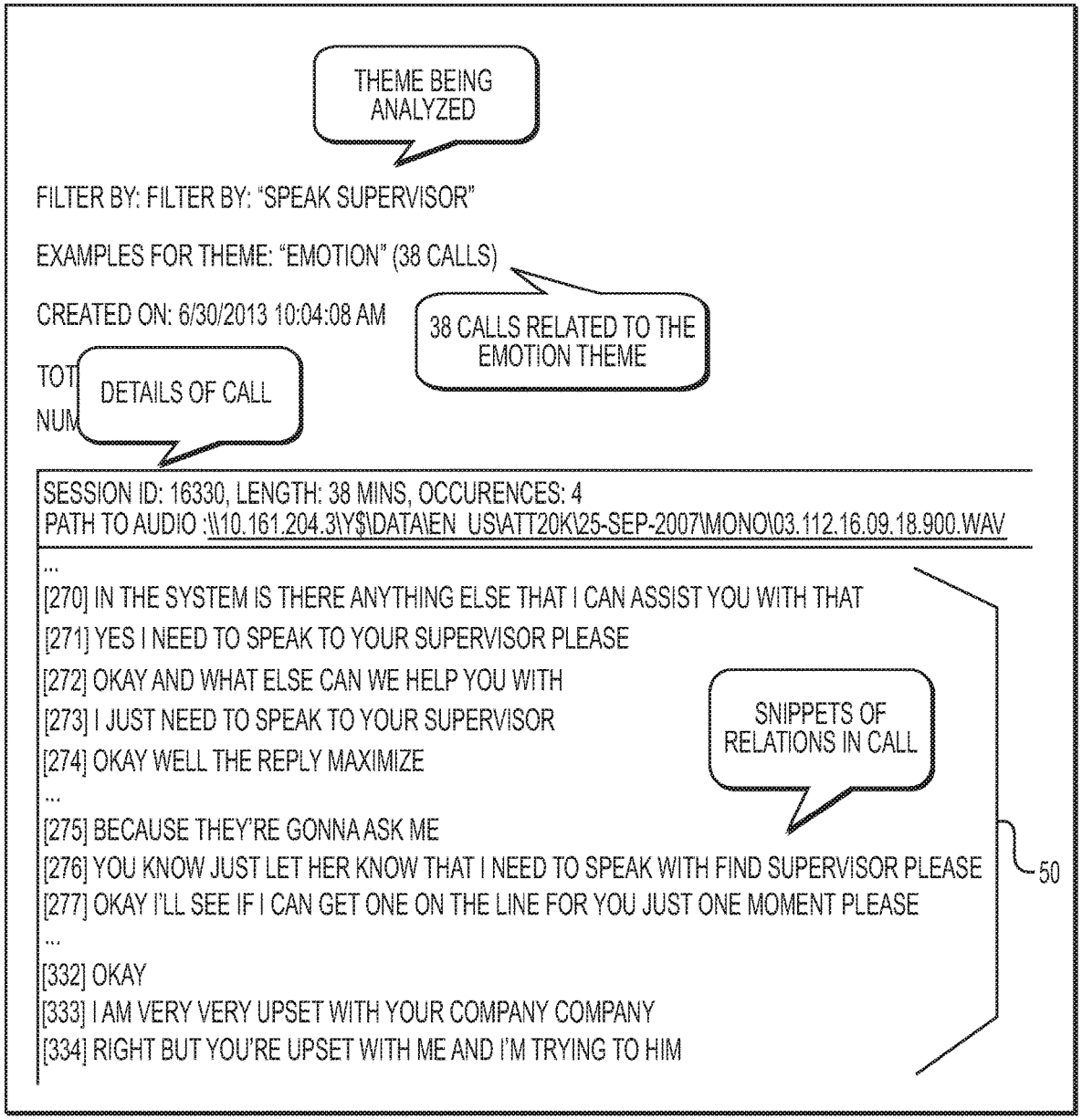
FIG. 3 is an exemplary embodiment of a display showing summaries of communication data.

FIG. 3 is an exemplary embodiment of an output of a summary module, which is a display showing summaries of communication data related to the themes "emotion" and "speak supervisor". As demonstrated in FIG. 3, the display may include a listing of the theme or themes being analyzed. Other relevant information about the query and/or the dataset may be included, such as identification of the dataset that is being analyzed, the time of the query, the number of relevant identified themes and/or occurrences of those themes, etc. The snippets 50, or at least a portion thereof, are displayed which convey to the user the meaning of the relevant portions of the communication data.

Figure 4:
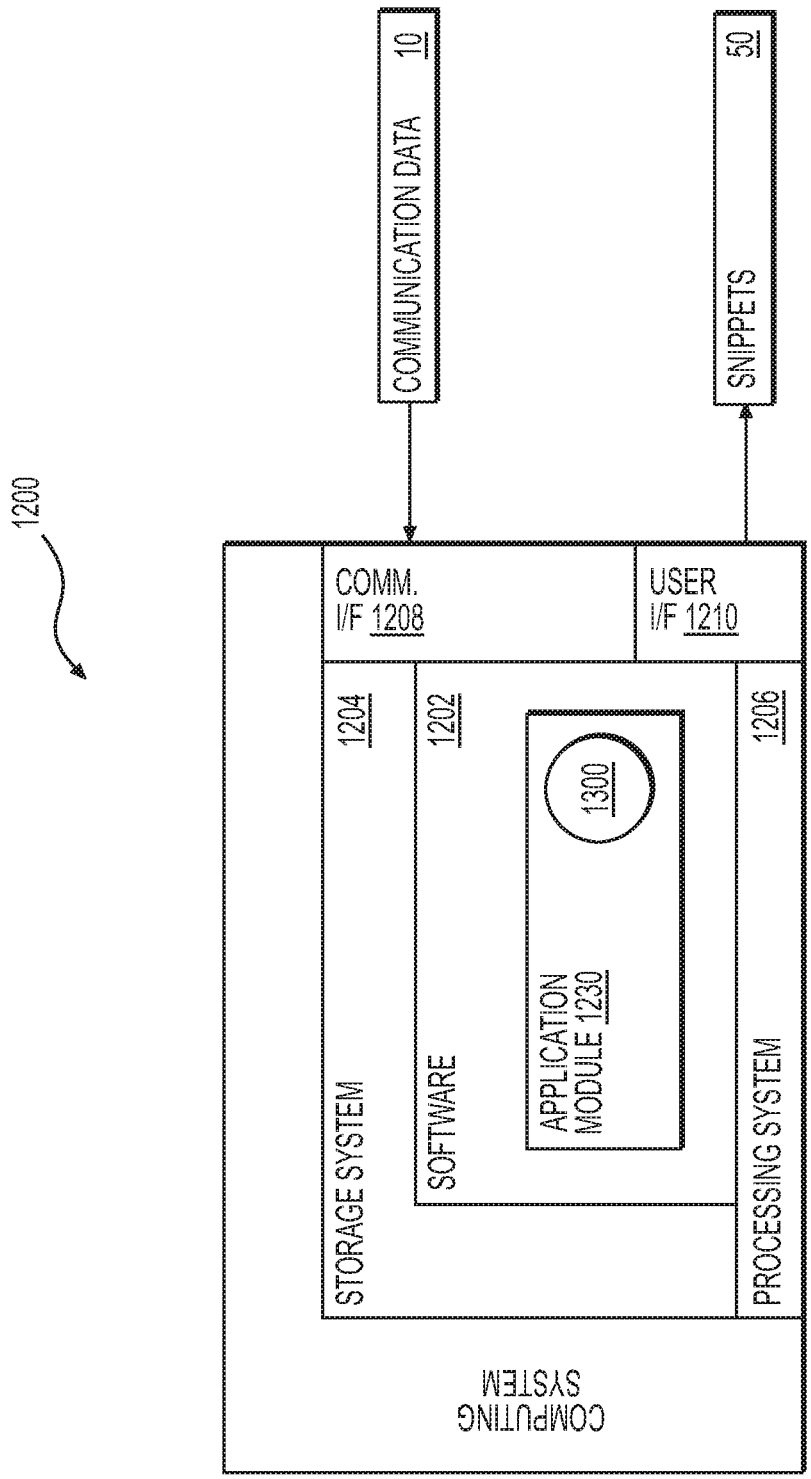
FIG. 4 is a system diagram of a system for creating a communication data summary.

FIG. 4 is a system diagram of an exemplary embodiment of a system 1200 for automated language model adaptation implementing a summary module 1300. The system 1200 is generally a computing system that includes a processing system 1206, storage system 1204, software 1202, communication interface 1208 and a user interface 1210. The processing system 1206 loads and executes software 1202 from the storage system 1204, including application module 1230. When executed by the computing system 1200, application module 1230 directs the processing system 1206 to operate as described in herein in further detail, including execution of the summary module 1300.

Although the computing system 1200 as depicted in FIG. 4 includes one software module in the present example, it should be understood that one or more modules could provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in executing program instructions. Examples of processing system 1206 include general purpose central processing units, application specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller, capable of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210. As disclosed in detail herein, the user interface 1210 operates to output the created snippets 20.

As described in further detail herein, the computing system 1200 receives communication data 10. The communication data 10 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio data received in real time or near-real time by the computing system 1200.

This written description uses examples to disclose the invention, including the best mode, and also to enable any person skilled in the art to make and use the invention. The patentable scope of the invention is designed by the claims, and may include other examples that occur to those skilled in the art. Such other examples are intended to be within the scope of the claims if they have structural elements and/or method steps that to not differ from the literal language of the claims, or if they include equivalent structural elements and/or method steps with insubstantial differences from the literal languages of the claims.

The invention claimed is:

1. A method of automatically developing an ontology via a computer system based on communication data and summarizing the communication data using the ontology, wherein the ontology is a structural representation of language elements and the relationships between those language elements within the dataset stored in memory of the computer system, the method comprising:
  receiving, by the computer system, the communication data, wherein the communication data comprises conversational communication data comprising a plurality of words;
  identifying, from among the plurality of words, defined terms;
  defining relations between the defined terms within the conversational communications data;
  identifying themes within the conversational communications data, wherein the themes are groups of the relations having similar meaning;
  identifying, by the computer system, one or more relevant themes from the identified themes in the ontology, wherein the relevant themes include a set of the relations in the ontology that compose the relevant themes;
  locating, by the computer system, the relevant themes in the conversational communication data;

creating, by the computer system, snippets of the conversational communication data to include the located relevant themes, wherein the snippets include a certain number of characters, words, lines, sentences and/or meaning units in the conversational communication data before and/or after each located theme; and
displaying, by the computer system, the snippets.

2. The method of claim 1, further comprising receiving one or more terms from a user, and wherein the step of identifying one or more relevant themes includes identifying as relevant one or more identified themes that relate to the one or more terms received from the user.

3. The method of claim 1, wherein the step of identifying one or more relevant themes includes presenting a list of the identified themes in the ontology to a user and receiving a selection from the user of one or more of the identified themes presented in the list.

4. The method of claim 3, wherein the list of themes includes all of the identified themes in the ontology.

5. The method of claim 3, wherein the list of the identified themes includes a predefined number of themes in the ontology that appear most commonly in a dataset.

6. The method of claim 3, wherein the list of the identified themes includes themes in the ontology that appear in a dataset at least a predefined number of times.

7. The method of claim 1, wherein the conversational communication data is one of: a transcript of an interpersonal interaction; an audio recording; streaming audio; transcription of spoken content; written correspondence or communication; email; physical mail; internet chat; and text message.

8. The method of claim 1, further comprising:
dividing the conversational communication data into a plurality of meaning units; and
wherein creating the snippets includes selecting one or more meaning units that include the located relevant themes.

9. The method of claim 1, wherein the snippets are arranged temporally to provide a summary of the conversational communication data.

10. A communication system for automatically developing an ontology based on communication data and summarizing the communication data using the ontology, wherein the ontology is a structural representation of language elements and the relationships between those language elements within the dataset stored in memory of the computer system, the system comprising a processing system comprising computer-executable instructions stored on memory that can be executed by a processor in order to:
receive communication data, wherein the communication data comprises conversational communication data comprising a plurality of words;
identify, from among the plurality of words, defined terms;
define relations between the defined terms within the conversational communications data;
identify themes within the conversational communications data, wherein the themes are groups of the relations having similar meaning;
identify one or more relevant themes from the identified themes in the ontology, wherein the relevant themes include a set of the relations in the ontology that compose the relevant themes;
locate the relevant themes in the conversational communication data;
create snippets of the conversational communication data to include the located relevant themes, wherein the snippets include a certain number of characters, words, lines, sentences and/or meaning units in the communication data before and/or after each located theme; and
display the snippets.

11. The system of claim 10, wherein the computer-executable instructions can be further executed by a processor in order to receive one or more terms from a user, and wherein the step to identify as relevant one or more relevant identified themes includes to identify one or more themes that relate to the one or more terms received from the user.

12. The system of claim 10, wherein the step to identify one or more relevant themes includes to present a list of the identified themes in the ontology to a user and receive a selection from the user of one or more of the identified themes presented in the list.

13. The system of claim 12, wherein the list of themes includes all of the identified themes in the ontology.

14. The system of claim 12, wherein the list of the identified themes includes a predefined number of themes in the ontology that appear most commonly in a dataset.

15. The system of claim 12, wherein the list of the identified themes includes themes in the ontology that appear in a dataset at least a predefined number of times.

16. The system of claim 10, wherein the conversational communication data is one of: a transcript of an interpersonal interaction; an audio recording; streaming audio; transcription of spoken content; written correspondence or communication; email; physical mail; internet chat; and text message.

17. The system of claim 10, further comprising:
dividing the conversational communication data into a plurality of meaning units; and
wherein to create the snippets includes to select one or more meaning units that include the located relevant themes.

18. The system of claim 10, wherein the snippets are arranged temporally to provide a summary of the conversational communication data.

19. A computer readable non-transitory storage medium comprising computer-executable instructions that when executed by a processor of a computing device performs a method of automatically developing an ontology via a computer system based on communication data and summarizing the communication data using the ontology, wherein the ontology is a structural representation of language elements and the relationships between those language elements within the dataset stored in memory of the computer system, the method comprising:
receiving the communication data, wherein the communication data comprises conversational communication data comprising a plurality of words;
identifying, from among the plurality of words, defined terms;
defining relations between the defined terms within the conversational communications data;
identifying themes within the conversational communications data, wherein the themes are groups of the relations having similar meaning;
identifying one or more relevant themes from the identified themes in the ontology, wherein the relevant themes include a set of the relations in the ontology that compose the relevant themes;
locating the relevant themes in the conversational communication data;
creating snippets of the conversational communication data to include the located relevant themes, wherein the snippets include a certain number of characters, words, lines, sentences and/or meaning units in the conversational communication data before and/or after each located theme; and
displaying the snippets.

* * * * *